United States Patent [19]

Taomo et al.

[11] Patent Number: 5,752,892
[45] Date of Patent: May 19, 1998

[54] DRIVING FORCE TRANSMISSION DEVICE AND PORTABLE WORKING MACHINE USING THE SAME

[75] Inventors: Toshio Taomo; Wang Yan Song, both of Tokyo, Japan

[73] Assignee: Kioritz Corporation, Tokyo, Japan

[21] Appl. No.: 645,591

[22] Filed: May 13, 1996

[30] Foreign Application Priority Data

May 16, 1995 [JP] Japan .................................. 7-117022

[51] Int. Cl.6 .......................................................... F16H 7/10
[52] U.S. Cl. ............................................... 474/112; 474/150
[58] Field of Search ..................................... 474/112, 133, 474/135, 101, 148, 150, 74

[56] References Cited

U.S. PATENT DOCUMENTS

| | | | |
|---|---|---|---|
| Re. 34,543 | 2/1994 | Komorowski | 474/112 |
| 2,196,255 | 4/1940 | Dow | 474/112 |
| 2,909,074 | 10/1959 | Schetterlein | 474/112 X |
| 3,306,120 | 2/1967 | Kratzsch | 474/112 X |
| 3,581,853 | 6/1971 | Hoff | 474/70 |
| 3,733,919 | 5/1973 | Rupp | 474/112 |
| 3,893,240 | 7/1975 | Morner et al. | |
| 4,237,744 | 12/1980 | Jolly | 474/112 X |
| 4,501,576 | 2/1985 | Tanaka et al. | 474/112 X |
| 4,532,844 | 8/1985 | Chang et al. | 474/112 X |
| 4,541,502 | 9/1985 | Iwai et al. | 474/112 X |
| 4,551,120 | 11/1985 | Tomey | 474/112 |
| 4,568,318 | 2/1986 | Johnson et al. | 474/112 |
| 4,595,384 | 6/1986 | Tertinek | 474/112 |
| 4,620,367 | 11/1986 | Tubesing et al. | |
| 4,714,453 | 12/1987 | Takayanagi | 474/112 |
| 4,789,042 | 12/1988 | Pitts | 474/112 X |
| 4,809,438 | 3/1989 | Nagashima et al. | |
| 4,816,012 | 3/1989 | Bytzek | 474/112 |
| 4,824,421 | 4/1989 | Komorowski | 474/112 |
| 4,977,708 | 12/1990 | Kloft | |
| 5,177,871 | 1/1993 | Martenson | |

*Primary Examiner*—Roger J. Schoeppel
*Attorney, Agent, or Firm*—Armstrong, Westerman, Hattori, McLeland & Naughton

[57] ABSTRACT

The present invention provides a driving force transmission device (P) which is adapted so that the distance (Ls) between the driving force transmission wheels such as a pair of pulleys (16,32) can readily and surely be changed, thereby, making it possible to constantly exert an appropriate tension on a driving force transmission member such as a belt (22), even without a tension roller. The driving force transmission device (P) includes: a first driving force transmission wheel (16) which is driven to rotate, a second driving force transmission wheel (32), an endless driving force transmission member (22) mounted around both the first driving force transmission wheel (16) and the second driving force transmission wheel (32) for transmitting driving force therebetween, and an eccentric shaft (40) which has a pivotal axis (O) at a position eccentric to an axis (Cb) of the second driving force transmission wheel (32) and on which the second driving force transmission wheel (32) is rotatably mounted. The driving force transmission device (P) is adapted so that the distance (Ls) between an axis (Ca) of the first driving force transmission wheel (16) and the axis (Cb) of the second driving force transmission wheel (32) can be changed by pivotally moving the eccentric shaft (40) about the pivotal axis (O).

17 Claims, 5 Drawing Sheets

DRIVING FORCE TRANSMISSION DEVICE AND PORTABLE WORKING MACHINE USING THE SAME

FIELD OF THE INVENTION

The present invention relates to a driving force transmission device adapted to transmit driving force via an endless belt or chain mounted around a pair of driving force transmission wheels such as pulleys or sprocket wheels, and a portable working machine such as an engine cutter which employs the driving force transmission device.

BACKGROUND OF THE INVENTION

Portable working machines, such as an engine cutter or similar, typically use an endless member-on-wheels type of driving force transmission device. In such driving force transmission devices, the endless member-on-wheels is usually adapted to transmit driving force via an endless transmission member, a V-belt for example, mounted around a pair of driving force transmission wheels, V-belt pulleys for example, for transmitting driving force of a prime mover, such as an internal combustion engine, an electric motor or similar, to an operative portion including a cutter or similar.

In a driving force transmission device of this type, predetermined tension is always required to be exerted on the belt in order to reduce transmission loss of driving force. Accordingly, a tension roller, for example, has additionally heretofore been provided and applied to the belt. However, in a portable working machine which is preferred to be small in size and light in weight, it is likely that such a tension roller cannot be provided because of restrictions on the amount of space available. Further, the tightness of the belt is likely to gradually slacken due to elongation, wear or similar with use. Therefore, it is usually impossible to cope with the difficulty only by means of a tension roller.

Accordingly, it has been proposed that the distance between the axes of a pair of pulleys be adapted to be adjustable to thereby always exert predetermined tension on the belt. The most popular of the conventional modes for adjusting the distance between a pair of pulleys is a mode which includes moving a pair of pulleys relative to each other along the line connecting the axes of the pulleys by so-called thread-transfer of a supporting member supporting one of the pulleys by means of a threaded rod (see, for example, Japanese Examined Utility Model Publication Nos. 1 8084/1993 and 11924/1995).

However, in such a driving force transmission device which is adapted to adjust a distance between a pair of pulleys by so-called thread-transfer using a threaded rod as described above, in order to replace the belt or adjust the distance between pulleys, loosening of a plurality of bolts fixing the supporting member or similar and appropriate tightening or loosening the threaded rod is required. This is troublesome and time-consuming. In particular, when a V-belt which is thick is used as a belt, in order to replace the V-belt it is necessary to move the pulley over a considerable distance. For carrying out the adjustment by thread-transfer as described above, it is required that the threaded rod be turned over and over. This is time-consuming and laborious. Further, since strong tension is exerted on the belt in order to extend the distance between the pair of pulleys, extremely strong force is required to turn the threaded rod. Accordingly, the adjustment operation is by no means carried out easily.

SUMMARY OF THE INVENTION

The present invention has been made in view of above-described problems. It is, therefore, an object of the present invention to provide a driving force transmission device adapted so that the distance between driving force transmission wheels, such as the pair of pulleys, can readily and surely be changed, and that it is thereby possible to constantly exert an appropriate tension on the driving force transmission member, such as a belt, without a tension roller.

To attain the above object, the driving force transmission device according to the present invention includes:

a first driving force transmission wheel which is driven to rotate;

a second driving force transmission wheel, an endless driving force transmission member mounted around both the first driving force transmission wheel and the second driving force transmission wheel for transmitting a driving force therebetween; and an eccentric shaft which has a pivotal axis at a position eccentric to an axis of the second driving force transmission wheel and on which the driving force transmission wheel is rotatably mounted;

the driving force transmission device being adapted to be such that the distance between an axis of the first driving force transmission wheel and the axis of the second driving force transmission wheel can be changed by pivotally moving the eccentric shaft about the pivotal axis.

In a preferred embodiment, a control lever in the form of a plate is fixed to the eccentric shaft for pivotally moving the eccentric shaft about the pivotal axis. In another preferred embodiment, rib-like protrusions on a supporting member supporting the second driving force transmission wheel, are radially formed around the pivotal axis for engaging a tool therewith to pivotally move the control lever.

The portable working machine according to the present invention employs the above-described driving force transmission device for transmitting driving force between a prime mover and an operative portion including a cutter or similar.

In a preferred embodiment, the operative portion is mounted onto a body provided with the prime mover via a supporting arm, and the supporting arm is adapted to pivotally move about the pivotal axis of the eccentric shaft with which the driving force transmission device is provided.

In a preferred embodiment of the driving force transmitting device according to the present invention which is constructed as described above, to replace the driving force transmission member such as a belt or to increase tension exerted thereon, the control lever fixed to the eccentric shaft is pivotally moved. The second pulley is thereby pivotally moved about the pivotal axis together with the eccentric shaft, so that position of the axis of the second pulley is moved in an arc. Consequently, the distance from the axis of the first pulley to the axis of the second pulley is changed.

The operational angle through which the control lever, relative to the eccentric shaft, is turned is at most 180 degrees, and by virtue of this, operational labor is remarkably reduced as compared with the conventional mode as mentioned above which adjusts a distance between pulleys using a threaded rod or similar. Further, since the distance between the pair of driving force transmission wheels such as pulleys can readily and simply be changed, it is possible to constantly exert an appropriate tension on the driving force transmission member without a tension roller.

Further, the driving force transmission device according to the present invention is used in a portable working machine for transmitting driving force between a prime mover and an operative portion including a cutter or similar, thereby enabling a portable working machine which is of minimal size and weight to be realized.

In the above-mentioned conventional device which adjusts the distance between the wheels by means of the threaded rod, the second driving force transmission wheel is moved in straight line by so-called thread transfer. On the other hand, in the present invention, the second driving force transmission wheel is pivotally moved in an arc. Accordingly, the position of the second driving force transmission wheel relative to the first driving force transmission wheel is changed not only in the to-and-fro direction (X direction) but also in the vertical direction (Y direction). However, since the driving force transmission member, such as a belt, is mounted around the pair of driving force transmission wheels, no problem is caused in the transmission of driving force.

Furthermore, the operative portion is mounted onto the body provided with the prime mover via the supporting arm, and the supporting arm is adapted to be pivotally moved about the pivotal axis of the eccentric shaft with which the driving force transmission device is provided. By virtue of this, the inclination angle of the operative portion can advantageously be changed according to operational surroundings.

DESCRIPTION OF THE PREFERRED EMBODIMENTS

Figure 1:
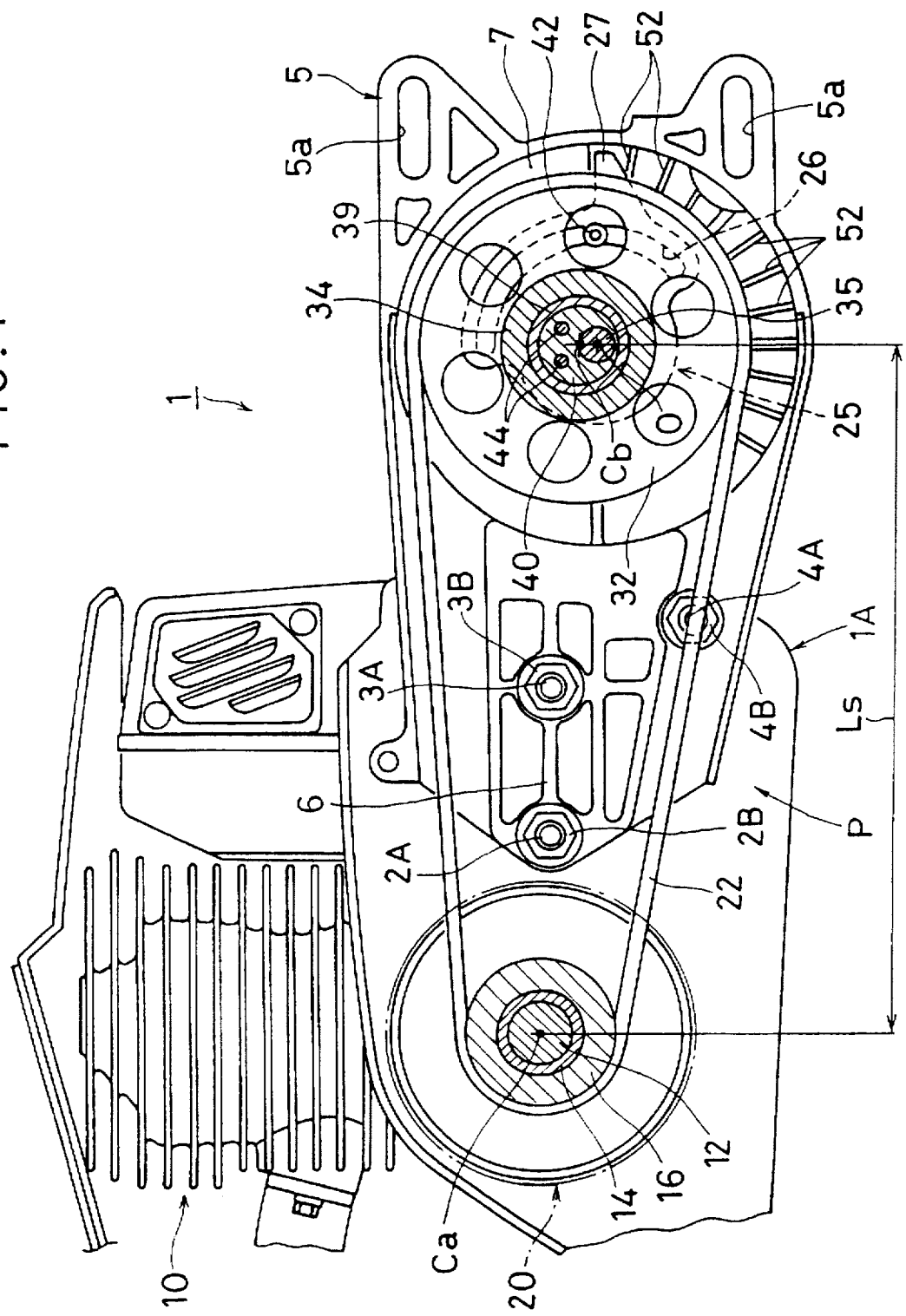
FIG. 1 is a side view showing a main portion of one type of an engine cutter useable as the portable working machine which employs one embodiment of the driving force transmitting device according to the present invention.
Figure 2:
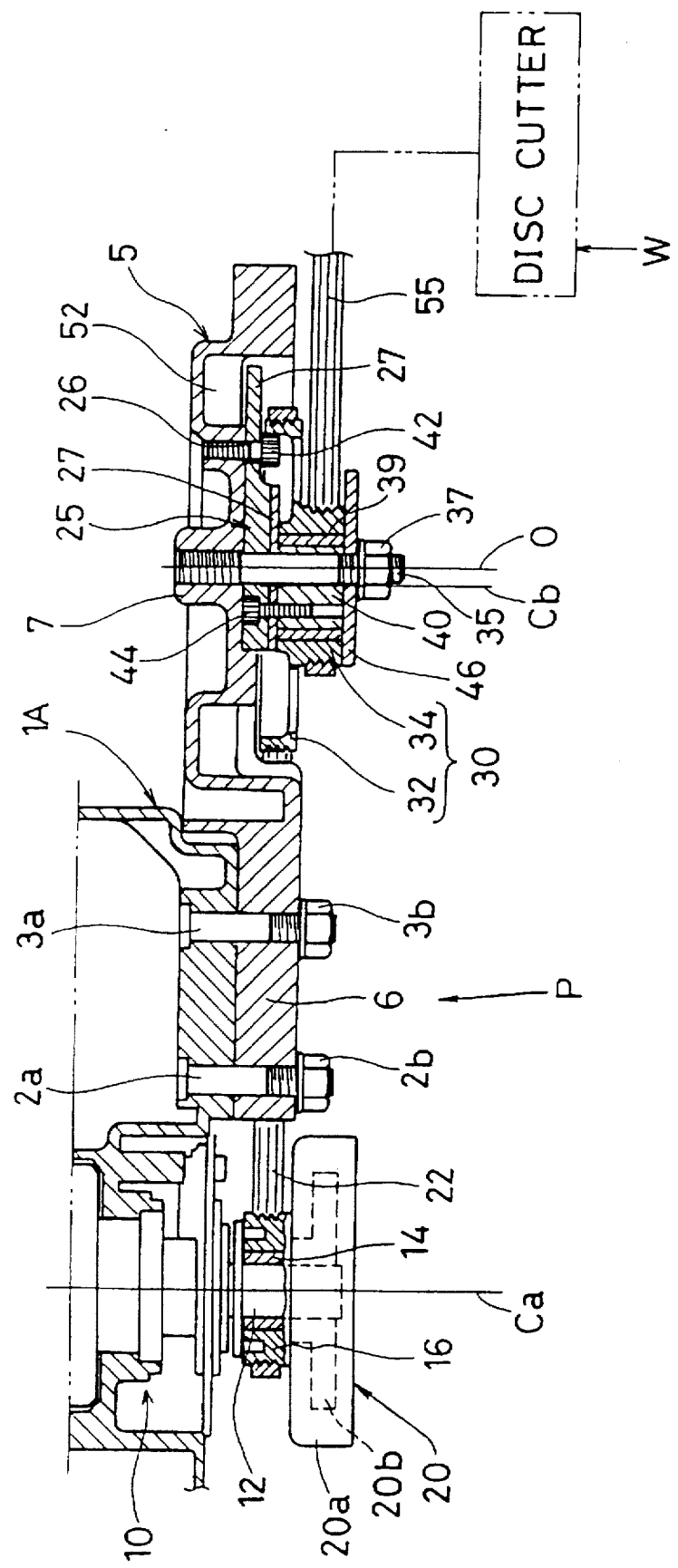
FIG. 2 is a horizontal sectional view of the main portion of the embodiment shown in FIG. 1.

FIGS. 1 and 2 show a main portion of one type of an engine cutter useable as the portable working machine which employs one embodiment of the driving force transmitting device according to the present invention.

The engine cutter 1 has a body 1A which includes an air-cooled two-cycle gasoline engine 10 as a prime mover. A box-shaped supporting member 5 is mounted onto the body 1A of the engine cutter 1 at the supporting member's mounting base 6 by means of stud bolts 2A, 3A, 4A and nuts 2B, 3B, 4B. An operative portion W is mounted onto the supporting member 5. The operative portion W includes a safety cover and a disc cutter is mounted at a pair of long holes 5a, 5a formed in the distal end of the supporting member 5. The position of the operative portion can be changed along the longitudinal direction of the long holes 5a, 5a.

A driving force transmitting device P of this embodiment is disposed between the engine 10 and the operative portion. The driving force transmitting device P includes a small diameter multi-groove V-belt pulley 16 as a first transmission wheel fitted on a crank shaft 12 of the engine 10 via a bearing 14, a large diameter multi-groove V-belt or first pulley 32 as a second transmission wheel mounted on a or second pulley mounting portion 7 of the supporting member 5 in a manner which will be described below, a multi-row V-belt 22 as an endless transmission member mounted around both the first pulley 16 and the second pulley 32 for transmitting driving force therebetween, and an eccentric shaft 40 on which the second pulley 32 is rotatably mounted via a bearing 39.

In more detail, on distal and proximal portions of the crank shaft 12 of the engine 10, a centrifugal shoe mounting boss 20b of the centrifugal clutch 20 is fixedly fitted and the first pulley 16 fixedly connected to a clutch drum 20a of the centrifugal clutch 20 is rotatably fitted, respectively. When a revolutional speed of the crank shaft 12 of the engine 10 is less than a clutch-in revolutional speed, the first pulley 16 is not actuated and thus the driving force is not transmitted. On the other hand, when the revolutional speed of the crank shaft 12 is greater than the clutch-in revolutional speed, the centrifugal clutch 20 is actuated to cause the first pulley 16 to rotate together with the crank shaft 12.

The rotational force of the first pulley 16 is transmitted to the second pulley 32 through the V-belt 22. The second pulley 32 is combined with a third pulley 34 having the same diameter as that of the first pulley 16 to form a dual pulley 30. Thus the rotational driving force of the crank shaft 12 is transmitted to the dual pulley 30 by means of the driving force transmitting device P of this embodiment. The rotational driving force of the crank shaft 12 is greatly decelerated by the dual pulley 30 and is transmitted from the third pulley 34 to a fourth pulley (not shown) having the same diameter as that of the second pulley 32 through a V-belt 55 being of the same size as the V-belt 22.

The eccentric shaft 40, on which the dual pulley 30 composed of the second pulley 32 and the third pulley 34 is rotatably mounted, is fitted on a stud bolt 35 screwed onto the pulley mounting portion 7 of the supporting member 5 through the second pulley 32 (and the third pulley 34) at a portion eccentric to the rotational axis Cb thereof, and thereby adapted to pivot about pivotal axis O which is the axis of the stud bolt 35 and the eccentric shaft 40. To the rear surface (facing to the pulley mounting portion 7) of the eccentric shaft 40 is fixed a control lever 25 in the form of a substantially fan-shaped plate for pivotally moving the eccentric shaft 40 about the pivotal axis O by means of two bolts 44. The eccentric shaft 40 and the control lever 25 are pivotally mounted to the pulley mounting portion 7 by a nut 37 screwed on the stud bolt 35 with interposition of a thrust plate 46.

The control lever 25 fixed to the eccentric shaft 40 is formed with a control tongue 27 protruding from the periphery of the control lever 25 and an arch-like long hole 26 at a peripheral position of the control lever 25. Through the long hole 26, a fastening bolt 42 is screwed into an internal thread 43 formed in the pulley mounting portion 7. The control lever 25 and the eccentric shaft 40 are thereby fixed to the pulley mounting portion 7.

In a circumferential portion of the pulley mounting portion 7 of the supporting member 5, rib-like protrusions 52, 52, . . . are radially formed around the pivotal axis O for engaging a tool therewith to pivotally move the control lever 25.

In the driving force transmitting device P, to replace the V-belt 22 or to increase tension exerted thereon, the nut 37 screwed on the stud bolt 35 and the fastening bolt 42 are loosened and then the control lever 25 fixed to the eccentric shaft 40 is pivotally moved. In this operation, the control lever 25 is pivotally moved with ease by applying a tip of a tool such as a screw driver to one of the rib-like protrusions 52 and pushing the control tongue 27 of the control lever 25 by use of leverage. The second pulley 32 is thereby pivotally moved about the pivotal axis O together with the eccentric shaft 40, so that the position of the axis Cb of the second pulley 32 is moved in an arc. Consequently, the distance Ls from the axis Ca of the first pulley 16 to the axis Cb of the second pulley 32 is changed.

Figure 3:
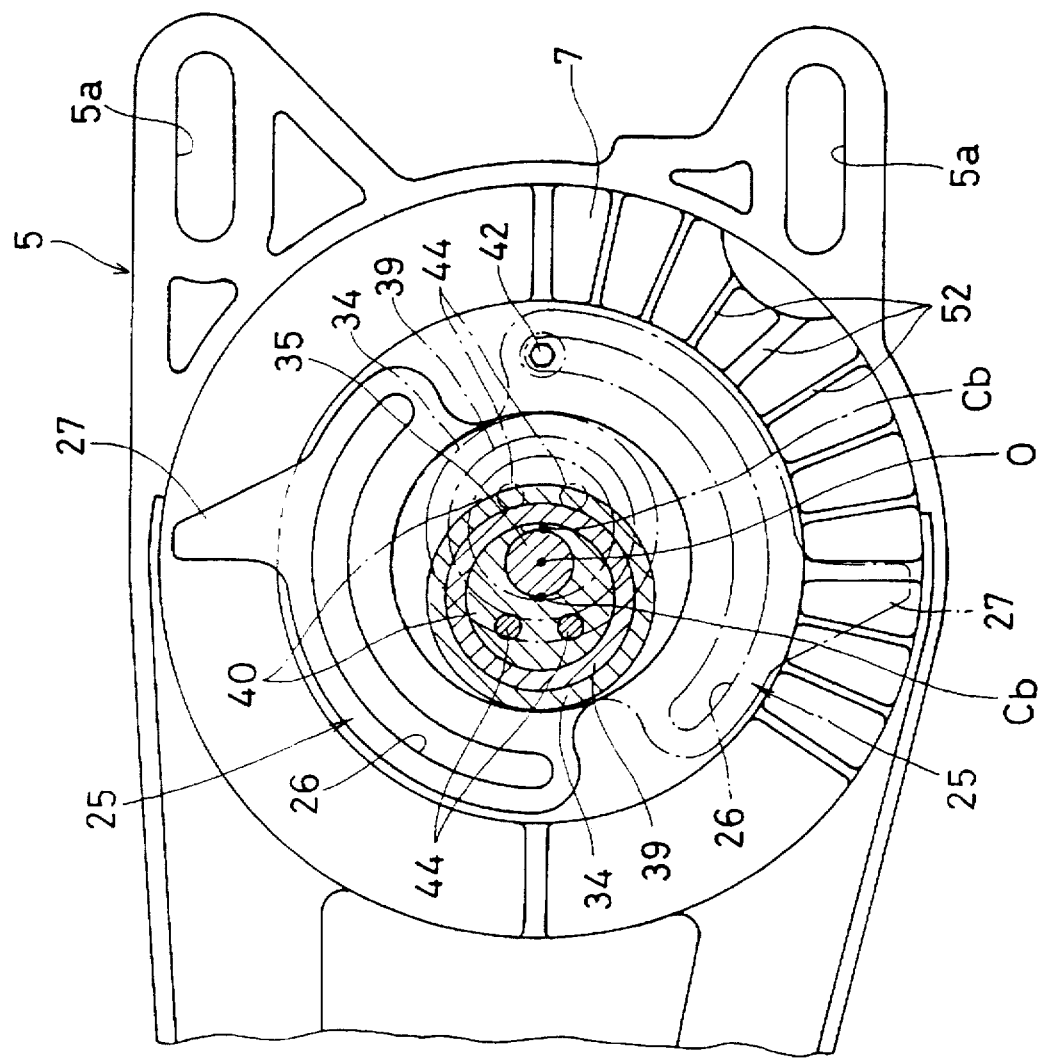
FIG. 3 is an enlarged partial view for illustrating operation of the main portion of the embodiment shown in FIG. 1.

Referring to FIG. 3, the distance Ls from the axis Ca of the first pulley 16 to the axis Cb of the second pulley 32 becomes smallest when the control lever 25 is turned counterclockwise through an angle of 90 degrees and becomes largest when the control lever 25 is turned clockwise through an angle of 90 degrees.

Accordingly, the operational angle through which the control lever 25 is turned is at most 180 degrees, and by virtue of this, operational labor is remarkably reduced as compared with the conventional mode described above which adjusts a distance between pulleys using a threaded rod or similar. Further, since the distance Ls between the pair of pulleys 16.32 can be easily changed, it is possible to constantly exert an appropriate tension on the V-belt 22 without a tension roller.

Figure 4:
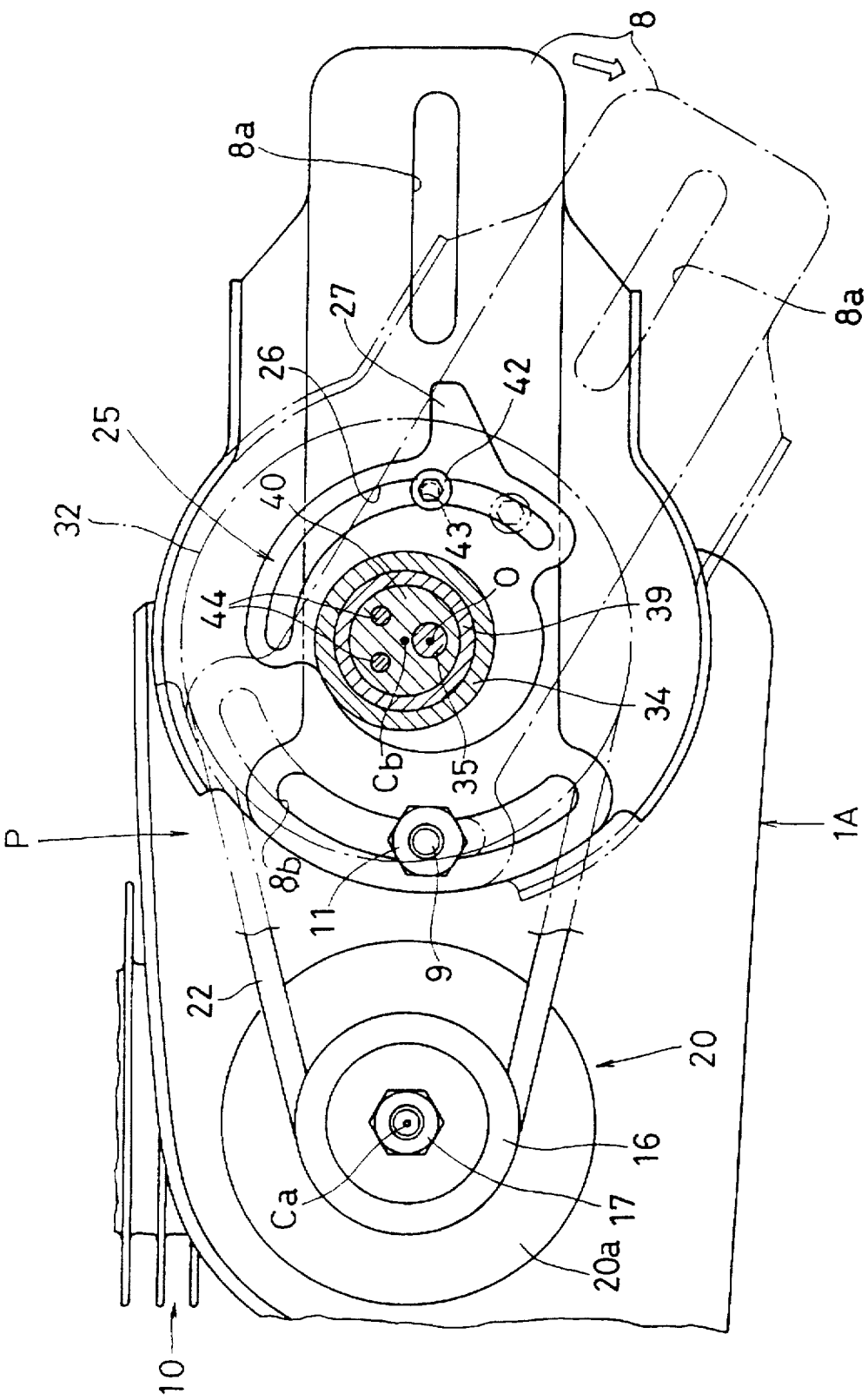
FIG. 4 is a side view showing a main portion of one embodiment of a hand-held chin saw useable as the portable working machine which employs another embodiment of the driving force transmitting device according to the present invention.
Figure 5:
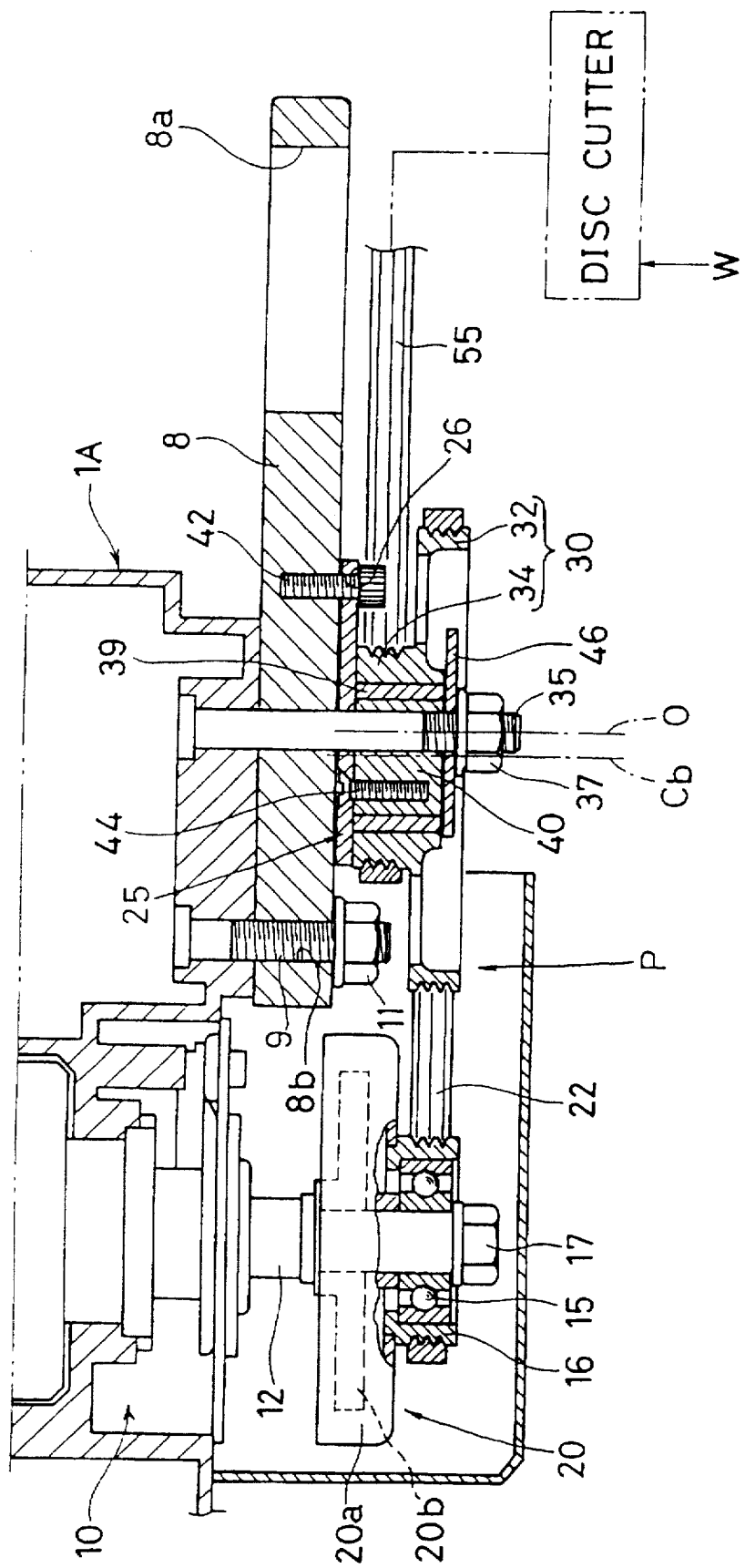
FIG. 5 is a horizontal sectional view of the main portion of the embodiment shown in FIG. 4.

FIGS. 4 and 5 show one type of a hand-held chain saw as the portable working machine to which a driving force transmitting device P having substantially the same construction as that of the above-described embodiment is applied. In FIGS. 4 and 5, the same reference numerals are used for the parts which the correspond to the parts as shown in FIGS. 1 to 3. Thus, no further explanation of these similar parts will be given. In the embodiment, the first pulley 16 is fitted, via a bearing 15, to the crank shaft 12 of the engine 10 by a fastening nut 17.

Referring to FIGS. 4 and 5, an operative portion including a chain saw guide bar (not shown) is mounted onto a body 1A provided with an engine 10 via a supporting arm 8. The supporting arm 8 is adapted to pivotally move about pivotal axis O of an eccentric shaft 40 of the driving force transmitting device P. A long hole 8a for mounting the operative portion is provided in a distal end portion of the supporting arm 8. A long arc shaped hole 8b having a center coincident with axis Cb of the second pulley 32 is formed in a proximal end portion of the supporting arm 8. A stud bolt 9 is inserted through the long hole 8b and is screwed into the body 1A. A nut 11 is screwed on the stud bolt 9. By tightening the nut 11, the supporting arm 8 can be fixed at a desired pivoted angular position.

By virtue of this, the inclination angle of the operative portion of the chain saw or similar can advantageously be changed arbitrarily according to operational surroundings without changing the tension of the V-belt 22.

In either embodiment. if the tension of the V-belt 55 undergoes substantial change due to adjustment in the tension of the V-belt 22, the mounting position of the operative portion may appropriately be changed along the long hole 5a or 8a of the supporting member 5 or supporting arm 8.

As understood from the above description, according to the present invention, excellent effects are attained because the distance between driving force transmission wheels such as the pair of pulleys can readily and surely be changed. Furthermore, it is possible to constantly exert an appropriate tension on the driving force transmission member such as a belt without a tension roller.

What is claimed is:

1. A driving force transmission device (P) comprising:
 a first driving force transmission wheel (16) which is driven to rotate;
 a second driving force transmission wheel (32);
 an endless driving force transmission means (22) mounted around an outside of both of said first driving force transmission wheel (16) and said second driving force transmission wheel (32) for transmitting driving force therebetween;
 an eccentric shaft (40) which has a pivotal axis (O) at a position eccentric to an axis (Cb) of said second driving force transmission wheel (32), wherein said second driving force transmission wheel (32) is rotatably mounted on said pivotal axis (O); and
 said driving force transmission device (P) being adapted so that a distance (Ls) between an axis (Ca) of said first driving force transmission wheel (16) and said axis (Cb) of said second driving force transmission wheel (32) can be changed by pivotally moving said eccentric shaft (40) about said pivotal axis (O);
 a control lever (25), fixed to said eccentric shaft (40), for pivotally moving said eccentric shaft (40) about said pivotal axis (O) wherein said control lever (25) includes a control tongue (27) extending radially outwardly from an outer periphery of said control lever (25) past said outside of said endless driving force transmission means (22) and an arcuate-shaped hole (26) through which a fastening bolt (42) extends axially to fix said control lever, (25) to a pulley mounting portion (7) of a supporting member (5); and
 rib-like protruding means (52, 52, . . . ) for engaging said control tongue (27) of said control lever (25) to pivotally move said control lever (25), said rib-like protruding means being radially formed around said pivotal axis (O) so at least some of said rib-like protruding means are located on said outside of said endless driving force transmission means (22).

2. The driving force transmission device according to claim 1, wherein a portable working machine employs said driving force transmission device (P) for transmitting driving force between a prime mover (10) and an operative portion (W) including a cutter.

3. The driving force transmission device according to claim 2, wherein said operative portion is mounted onto a body (1A) provided with said prime mover (10) via a supporting arm (8), and said supporting arm (8) is adapted to pivotally move about said pivotal axis (O) of said eccentric shaft (40) with which said driving force transmission device (P) is provided.

4. The driving force transmission device according to claim 1, wherein a portable working machine employs said driving force transmission device (P) for transmitting driving force between a prime mover (10) and an operative portion (W) including a cutter.

5. The driving force transmission device according to claim 4, wherein said operative portion is mounted onto a body (1A) provided with said prime mover (10) via a supporting arm (8), and said supporting arm (8) is adapted to pivotally move about said pivotal axis (O) of said eccentric shaft (40) with which said driving force transmission device (P) is provided.

6. The driving force transmission device according to claim 1, wherein a portable working machine employs said driving force transmission device (P) for transmitting driving force between a prime mover (10) and an operative portion (W) including a cutter.

7. The driving force transmission device according to claim 6, wherein said operative portion is mounted onto a body (1A) provided with said prime mover (10) via a supporting arm (8), and said supporting arm (8) is adapted to pivotally move about said pivotal axis (O) of said eccentric shaft (40) with which said driving force transmission device (P) is provided.

8. The driving force transmission device according to claim 1, wherein said first driving force transmission wheel (16) is a small diameter multi-groove V-belt pulley which is fitted on a crank shaft (12) of an internal combustion engine (1C) via a bearing (16).

9. The driving force transmission device according to claim 8, wherein said second driving force transmission wheel (32) is a large diameter multi-groove V-belt pulley mounted on a pulley mounting portion (7) of a supporting member (5) of said driving force transmission device (P).

10. The driving force transmission device according to claim 9, wherein said endless driving force transmission means (22) is a multi-row V-belt.

11. The driving force transmission device according to claim 10, wherein said crank shaft (12) has a distal portion on which a centrifugal shoe mounting boss (20b) of a centrifugal clutch (20) is fixedly fitted.

12. The driving force transmission device according to claim 11, wherein said first driving force transmission wheel (16) is fixedly connected to a clutch drum (20a) of said centrifugal clutch (20).

13. The driving force transmission device according to claim 12, wherein said crank shaft (12) has a proximal portion on which said first driving force transmission wheel (16), fixedly connected to said clutch drum (20a) of said centrifugal clutch (20), is rotatably fitted.

14. The driving force transmission device according to claim 13, wherein when a revolutional speed of said crank shaft (12) of said engine (10) is less than a clutch-in revolutional speed, said first driving force transmission wheel (16) is not actuated and thus said driving force is not transmitted.

15. The driving force transmission device according to claim 14, wherein when said revolutional speed of said crank shaft (12) of said engine (10) is greater than said clutch-in revolutional speed, said centrifugal clutch (20) is actuated and thus causes said first driving force transmission wheel (16) to rotate together with said crank shaft (12).

16. The driving force transmission device according to claim 15, further comprising a third driving force transmission wheel (34) wherein said second driving force transmission wheel (32) and said third driving force transmission wheel (34) are combined to form a dual driving force transmission wheel (30).

17. The driving force transmission device according to claim 16, wherein said driving force of said crank shaft (12) of said engine (10) is transmitted to said dual driving force transmission wheel (30) via said driving force transmitting device (P).

* * * * *